(12) United States Patent
Wu

(10) Patent No.: US 11,823,712 B2
(45) Date of Patent: Nov. 21, 2023

(54) BUILT-IN RESISTANCE SENSOR FOR MEASURING SLIDER LEVEL POLE WIDTH AT POINT "A" (PWA) FOR PMR/MAMR WRITERS

(71) Applicant: Headway Technologies, Inc., Milpitas, CA (US)

(72) Inventor: Yan Wu, Cupertino, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 16/997,155

(22) Filed: Aug. 19, 2020

(65) Prior Publication Data

US 2022/0059131 A1    Feb. 24, 2022

(51) Int. Cl.
*G11B 5/48*     (2006.01)
*G11B 5/11*     (2006.01)
*G11B 21/24*    (2006.01)

(52) U.S. Cl.
CPC .............. *G11B 21/24* (2013.01); *G11B 5/11* (2013.01); *G11B 5/4826* (2013.01)

(58) Field of Classification Search
CPC ......... Y10T 29/49048; Y10T 29/49041; Y10T 29/49034; Y10T 29/49046; G11B 5/3173; G11B 5/3169; G11B 5/3166; G11B 5/313; G11B 5/3116; G11B 5/187; G11B 5/235; G11B 21/24; G11B 5/11; G11B 5/4826

See application file for complete search history.

(56) References Cited

U.S. PATENT DOCUMENTS

| | | | | |
|---|---|---|---|---|
| 4,670,732 A | * | 6/1987 | Church | B24B 37/013 |
| | | | | 257/E43.006 |
| 5,065,483 A | * | 11/1991 | Zammit | G11B 5/3166 |
| 5,772,493 A | * | 6/1998 | Rottmayer | G11B 5/3903 |
| | | | | 451/8 |
| 5,816,890 A | * | 10/1998 | Hao | G11B 5/3903 |
| | | | | 451/5 |
| 5,991,698 A | * | 11/1999 | Hao | G11B 5/3103 |
| | | | | 257/E21.001 |
| 6,193,584 B1 | * | 2/2001 | Rudy | B24B 37/013 |
| | | | | 29/593 |
| 6,202,289 B1 | * | 3/2001 | Yoshimura | G11B 5/3106 |
| | | | | 29/603.12 |
| 6,347,983 B1 | * | 2/2002 | Hao | G11B 5/3903 |
| | | | | 451/10 |

(Continued)

*Primary Examiner* — Brian E Miller
(74) *Attorney, Agent, or Firm* — Saile Ackerman LLC; Stephen B. Ackerman

(57) ABSTRACT

A PMR (perpendicular magnetic recording) write head is configured for measurements at the slider level and wafer-level processing stages that will allow a determination of the pole width at a position A (PWA) using the results of a resistance measurement between a main pole (MP) and surrounding write shields (WS) with a layer of conductor in the write gap and a layer of insulating material replacing the side gaps. Knowledge of an accurate value of PWA allows adjustments to be made in the processing of sliders on each rowbar which, in turn improves the capability of delivering the desired statistical variation (sigma) in the distribution of erasure widths for AC signals (EWACS) in a given design which, in turn, gives better overall performance in hard disk drive (HDD) applications.

11 Claims, 3 Drawing Sheets

(56) References Cited

U.S. PATENT DOCUMENTS

| | | | |
|---|---|---|---|
| 6,884,148 B1* | 4/2005 | Dovek | B24B 37/30 451/8 |
| 7,206,172 B2* | 4/2007 | Ding | G11B 5/3912 |
| 7,265,942 B2 | 9/2007 | Hixson-Goldsmith et al. | |
| 8,018,678 B1* | 9/2011 | Zhang | G11B 5/3166 360/125.03 |
| 8,165,709 B1* | 4/2012 | Rudy | G11B 5/3173 700/121 |
| 8,443,510 B1* | 5/2013 | Shi | G11B 5/3166 29/603.16 |
| 8,453,317 B2* | 6/2013 | Allen | G11B 5/3166 29/603.16 |
| 9,111,550 B1* | 8/2015 | Liu | G11B 5/11 |
| 9,870,786 B2 | 1/2018 | Funayama et al. | |
| 10,279,451 B1* | 5/2019 | Liu | G11B 5/265 |
| 10,490,212 B2* | 11/2019 | Fujii | G11B 5/3163 |
| 10,657,990 B2* | 5/2020 | Ohtake | G11B 5/667 |
| 10,762,919 B1* | 9/2020 | Song | G11B 5/1278 |
| 10,789,975 B1* | 9/2020 | Song | G11B 5/3133 |
| 10,896,690 B1* | 1/2021 | Bai | G11B 5/115 |
| 10,943,616 B2* | 3/2021 | Asif Bashir | G11B 5/314 |
| 11,037,586 B1* | 6/2021 | Sherve | B24B 37/046 |
| 11,331,765 B1* | 5/2022 | Sherve | G11B 5/1871 |
| 2002/0173227 A1* | 11/2002 | Lam | B24B 49/10 451/48 |
| 2003/0030940 A1* | 2/2003 | Matono | G11B 5/3163 360/123.29 |
| 2003/0177631 A1* | 9/2003 | Gates | G11B 5/3103 29/603.12 |
| 2003/0200041 A1* | 10/2003 | Church | G11B 5/3903 |
| 2003/0222645 A1* | 12/2003 | Church | G11B 27/36 324/210 |
| 2005/0068676 A1* | 3/2005 | Lille | G11B 5/3116 360/125.74 |
| 2005/0219745 A1* | 10/2005 | Hixson-Goldsmith | G11B 5/187 360/119.07 |
| 2005/0219748 A1* | 10/2005 | Guthrie | G11B 5/313 360/119.11 |
| 2006/0028770 A1* | 2/2006 | Etoh | G11B 5/1278 |
| 2006/0168798 A1* | 8/2006 | Naka | G11B 5/3173 29/603.16 |
| 2008/0072418 A1* | 3/2008 | Kondo | G11B 5/315 29/603.12 |
| 2008/0222879 A1* | 9/2008 | Kagami | G11B 5/3116 29/603.12 |
| 2009/0144965 A1* | 6/2009 | Hirabayashi | G11B 5/3169 29/603.07 |
| 2009/0211081 A1* | 8/2009 | Boone, Jr. | B24B 37/042 29/603.15 |
| 2010/0146774 A1* | 6/2010 | Ohta | B24B 49/04 29/603.16 |
| 2010/0302662 A1* | 12/2010 | Toba | G11B 5/3173 |
| 2012/0094009 A1* | 4/2012 | Allen | G11B 5/6082 427/130 |
| 2012/0113543 A1* | 5/2012 | Shiimoto | G11B 5/315 360/75 |
| 2016/0329071 A1* | 11/2016 | Beaucage | G11B 5/6005 |
| 2018/0185978 A1* | 7/2018 | Smith | G11B 5/3173 |
| 2019/0267029 A1* | 8/2019 | Bai | G11B 5/235 |
| 2022/0059131 A1* | 2/2022 | Wu | G11B 21/24 |

* cited by examiner

BUILT-IN RESISTANCE SENSOR FOR MEASURING SLIDER LEVEL POLE WIDTH AT POINT "A" (PWA) FOR PMR/MAMR WRITERS

1. TECHNICAL FIELD

This disclosure relates generally to thin-film perpendicular magnetic writers (PMR) configured for use in conventional perpendicular magnetic recording (PMR) and microwave assisted magnetic recording (MAMR) and particularly to methods of assessing device quality at the wafer level.

2. BACKGROUND

Typically, critical dimension control on the wafer level relies on focused ion beam (FIB) cuts of the devices of interest at some precise locations followed by either scanning electron microscopy (SEM) or transmission electron microscopy (TEM) performed on the sample to obtain dimensional information of interest. This method is destructive and time consuming and limited to a very small sample size for a wafer.

A parameter of great interest is the pole width at the top of the main pole at the expected ABS position after slider lapping, herein denoted "pole width at position A" or PWA. This parameter is directly related to the track pitch capability of the device and also the writability of the device. A better measurement of this parameter on the wafer level and on the row bar level as well would be desirable.

At present, after the wafer is finished, during slider lapping either a magnetic write-width (MWW) meter, a device for measuring the magnetic field profile, or dynamic performance (DP) testing, using a simulated hard disk drive (HDD), is used to obtain the variation pattern of the writer head widths in a row-bar. The information obtained is applied to the processing of subsequent row-bars in order to obtain a better statistical distribution, sigma, (across the row bar) of the erase width produced by an AC signal (EWAC). This is done by bending the row bars according to a pattern determined with the help of the writer resistive lapping guide (WRLG/RLG) sensors which provide a resistance measurement to determine how far lapping has proceeded. Using such methods, a position along the main pole at which to obtain a consistent track width (PWA) can be determined.

MWW meter and DP tester are very time consuming for data collection and also suffer from testing variations. If an electrical measurement can lead to the prediction of PWA of a given device, it could greatly simplify the back-end process.

SUMMARY

It will be an object of the present disclosure to provide a method for determining certain write-head characteristics both on the wafer level and also in the wafer slicing and lapping phase of PMR write head fabrication.

It will be a further object of the present disclosure to provide such a method by use of an additional built-in sensor structure that is fabricated at the same time as the writer resistance lapping guide (WRLG) sensor.

It will be a further object of the present disclosure to provide such a method that can be used to determine PWA for a given device by a resistance measurement at the row level or slider level. This value of PWA can be used as an estimate for other devices.

It will be a further object of the present disclosure to use the information obtained from the new resistance sensor to improve the formation of all the PMR writers in the row bars and to improve the statistical variation (sigma) of the erase width of an AC signal (EWACS).

These advantages are all embodied in the perpendicular magnetic writer (PMR) which may also be configured for microwave assisted magnetic recording (MAMR), that now has a sensor that is disclosed herein as a built-in feature. The built-in sensor is used in conjunction with the WRLG sensor to enable additional information to be determined that would not be determinable using the WRLG sensor alone. It is to be noted that the entire PMR writer, with modifications that are described herein, becomes the sensor by the process of taking a resistance measurement, R, between its main pole (MP) and its write shield (WS) and then evaluating a formula expressing a relationship between R and the quantity PWA that is desired.

As is shown in the air-bearing surface (ABS) view of schematic FIG. 1, this sensor-equipped PMR includes a magnetic main pole (MP) 20 that emerges at the ABS and has a generally trapezoidal ABS face and cross-section that is wider at a trailing-edge surface than at a leading-edge surface. The trailing-edge and leading-edge surfaces are connected by mirror-image symmetrically formed side edge surfaces to complete the trapezoidal cross-section. It is the width of the MP at this position (i.e., position "A") that it is desired to measure by using an electrical measurement.

A write gap (WG) 10 is formed on the trailing edge of the MP, extending laterally and symmetrically beyond the trailing edge. A trailing shield 40, or write shield, WS, is formed above the write gap. Side gaps (SG) 30 are disposed on either side of the MP and they contact the leading shields 50 disposed to either side of the SG. The WG is filled with a conducting material, such as a stack of Ru/NiCrx/Ru in the PMR case or the microwave generator stack in the MAMR case. The SG 30 are filled with an insulating material such as AlOx. A resistance measuring circuit comprised of leads 90, 91 and resistance measurement device 95 is provided to measure a resistance, R2, between the MP and the WS. This will be discussed further below to indicate the relationship between the measured resistance R2 and the desired value of PWA.

To further clarify the various structures and dimensions to be discussed, we refer now to FIG. 2, which is a side cross-sectional view of the ABS view shown in FIG. 1. The WG 10 is shown formed on the trailing edge of the tapering ABS end of the MP 20. The WS 40 (also called the trailing shield (TS)) is above the WG 10. A leading shield (LS) 50 is formed beneath the MP but separated from it by dielectric material 30. The effective throat height, eTHd, which controls the magnetic flux, is shown measured between the two arrows 70 against the WS 40.

A dielectric layer 30 conformally surrounds the MP and forms a uniform gap between both side edge surfaces of said MP and the leading-edge surface of the MP. This dielectric layer has an upper planar surface that is coplanar with the trailing edge surface of the MP and extends symmetrically away from the MP, forming uniform gaps.

To satisfy these objects, we provide a new sensor that is fabricated at the same time as the WRLG sensor and can provide additional information to augment what is obtained when using only the WRLG sensor. Once this new sensor is calibrated, it can be used to estimate the cross-track pole width (PWA) of a given device at point A. This important information will be obtained by a resistance measurement at the row level or the slider level.

To form this built-in sensor, as shown in FIG. 1 and FIG. 2, we use a conductive material for the write gap (WG) 10 and insulating material for side gap (SG) 30. After WG material and WRLG material are deposited, the WRLG material being a conductive film that forms the WRLG sensor 80 shown in the top-down view in FIG. 6, they are both patterned in the same photo/IBE process to produce a well aligned back-edge for the eTHd (10e in FIGS. 2, 6) and back edge 80e for the WRLG sensor in FIG. 6. Note eTHd is the milled structure between arrows 70 contacting the write gap 10. It should be understood by those skilled in the art that the WRLG sensor is formed in a PMR writer adjacent to the built-in sensor structure shown in FIG. 1. The WRLG layer is lapped away during the lapping process and its resulting resistance change is measured and calibrated to its height (WRLGH) change.

During lapping, eTHd (also denoted SH in FIG. 2 although in general eTHd does not equal SH) can be calibrated to WRLG sensor height (WRLGH in FIG. 6), then the resistance that is measured between MP 20 and WS 40 using resistance measurement device 95 and leads 90, 91 can be used to derive PWA for each device, if the MP thickness is not too thin. If the MP thickness is thin, then the resistance will be affected by both PWA and PT.

By forming a writer eTHd structure similarly to what is done in fabricating MAMR heads, then at the same time, we can have the eTHd back edge line up with WRLG sensor back edge. If we electrically isolate the main pole (MP) from the shield structure (WS), with the exception of the leakage produced by the limiting shunting path as explained below, then the resistance from MP to WS that is measured during lapping is a function of eTHd and PWA. Since eTHd can be calibrated to WRLG sensor height, one can derive PWA value for each device during lapping without the need for additional pretest DP measurement or MWW measurement.

DETAILED DESCRIPTION

We describe a sensor that is fabricated at the same time as the WRLG sensor and which can provide additional information to augment what is obtained when using only the WRLG sensor. Once this new sensor is calibrated, it is used along with the WRLG sensor (shown in FIG. 6) to estimate the pole width (PWA) of a given PMR device at a point "A", of its ABS cross-track width. This important information will be obtained by means of an electrical resistance measurement of the resistance between the MP and WS using the sensor at the wafer-level, row level or slider level.

Figure 1:
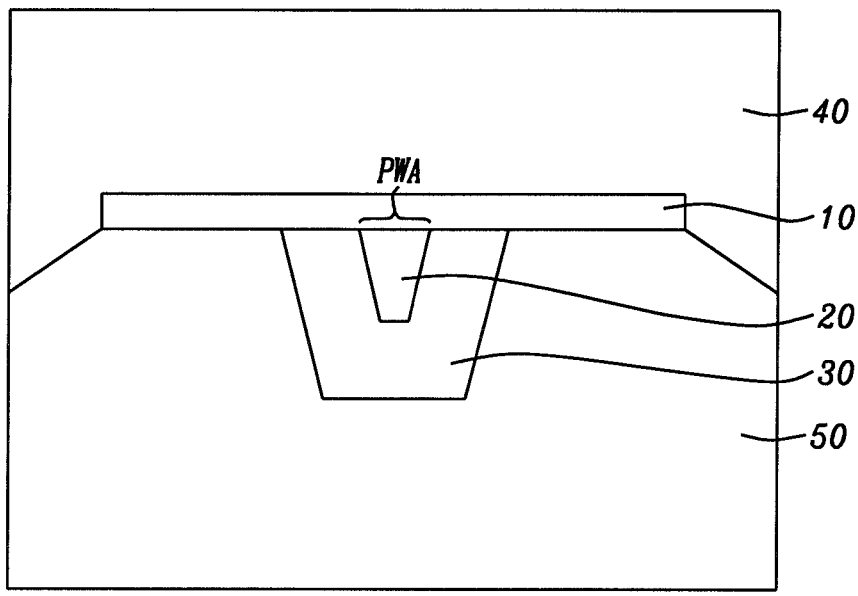
FIG. 1 is a schematic ABS view of a typical slider-mounted PMR writer head with the addition of elements forming a new, built-in, resistance sensor that will enable a determination of writer pole width (see FIG. 1) measured along its ABS trailing edge, denoted PWA, during wafer processing and during slider processing.
Figure 2:
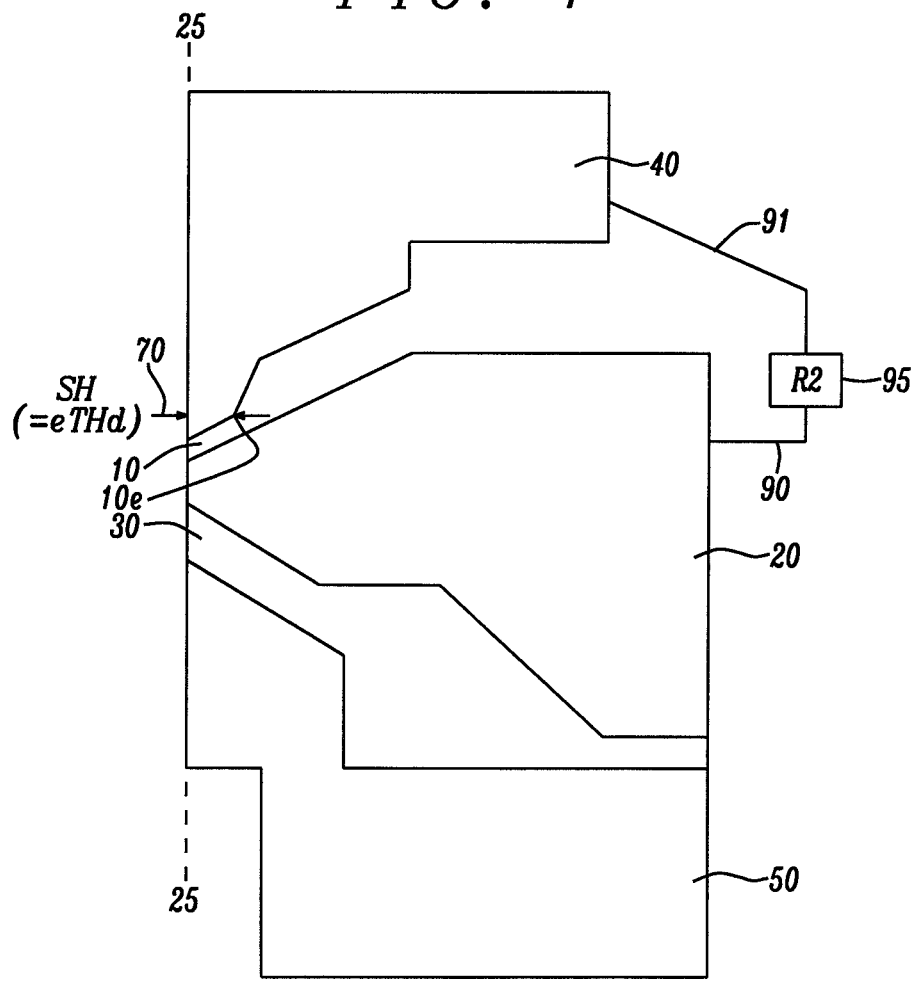
FIG. 2 is a schematic cross-sectional view through the center of the main pole of a portion near the ABS of a typical PMR writer such as that in FIG. 1. We show the step height (SH) (distance from ABS to the back edge of the write gap (WG) measured on the WG) and the effective throat height (eTHd) (measured on the trailing shield). In this figure we take SH=eTHd. In practice, the two dimensions may be different.

To form this sensor, as shown in the schematic ABS view of a PMR head in FIG. 1 and the side cross-sectional view of the same head in FIG. 2, we will use a conductive material, such as a stack of Ru/NiCrx/Ru, or other conducting material, in the write gap (WG) 10 and use insulating material, such as AlOx for the side gap (SG) 30. The stack can either form a conductive write gap in the case of a PMR writer or it can be the MAMR stack in the MAMR case.

After WG material and WRLG material are deposited they are patterned in the same photo/IBE (photolithographic/ion-beam etch) process used to produce a well-aligned back edge for the WG and WRLG. The horizontal distance from the back edge of the WG 10 to the ABS (see arrows in FIG. 2) is called the SH of the WG (WG SH).

Depending on the process utilized subsequent to WG SH definition, the effective throat height (eTHd) (70 in FIG. 2), which is the distance from the back edge of the WS to the ABS, can be made to be the same as the WG SH, or to have some offset. If eTHd and SH are different, then the smaller of the two will determine the resistance of the new sensor. For simplicity, we will assume that eTHd and SH are the same (as shown in FIG. 2) in the following discussion.

During lapping, WG SH can be calibrated to the WRLG sensor height so that the resistance that is measured between MP and WS can be used to derive the PWA for each device. If the MP is thin, then the resistance will be affected by both PWA and PT.

If we electrically isolate the main pole (MP) from the write shield structure (WS), with the exception of the leakage produced by the limited shunting path explained below, the resistance from MP to WS that is measured during lapping is a function of SH and PWA. Since SH can be calibrated to the WRLG sensor height, PWA can be derived for each device during lapping without the need for additional dynamic pretest (DP) measurement or MWW measurement.

Referring again to the schematic ABS view of FIG. 1, there is shown an exemplary PMR writer design with the addition of a new conductive element 10 in place of the usual write gap so as to create a new electrical resistance sensor that is incorporated into the structure. Note in the case of an MAMR writer, a MAMR oscillator stack can serve as the conductive element.

Replacing the write gap with a layer of conductive material 10, for example a layer of Ru/NiCrx/Ru, and forming the side gaps 30 with insulating material, we can measure the resistance, R2, between the main pole 20 and the write shields 40 and use the result of that measurement with resistance measurement device 95 to obtain PWA. Using the resistance measurement to obtain PWA requires evaluating the following formula:

$$R2=1/(A+B*PWA*SH+C*SH)+R\_L,$$

In the above formula, R2 is the resistance measured between the MP 20 and the write shields (WS) 40 and R_L is the resistance of the leads 90, 91 (FIG. 2) used to make the measurement. Measurements can be made using contact pads or probes. The quantities A, B and C are constants that reflect the contributions to R made by the physical parameters PWA and SH. By arranging a set of measurements using heads in which PWA and SH are varied and measured by other existing means (either SEM or using DP pretest), A, B and C can be obtained. Then, for a wafer-level system in which R2 is measured and PWA is not known, those values of A, B and C can be used to determine PWA. During lapping the value of SH can be calibrated to WRLG sensor height and then the resistance measured between MP 20 and WS 40 can be used to derive PWA for each device if the MP thickness is not too thin. If the MP thickness is thin, then the resistance R2 will be affected by both and the calibration formula should also include PT in that case.

Once PWA is determined from the sensor-equipped slider, it's value can be used as an estimate of the value in other sliders to make corrections in their processing. The use of this knowledge will thus provide better consistency in the device structures and an improvement in the statistical distribution (sigma) of the erasure width of an AC signal (EWACS), which was an object of this disclosure.

To form the sensor, a conductive material is needed for the write gap (WG) 10 and an insulating material is needed for the side gap (SG) 20. After WG material and WRLG material are deposited, they are patterned in the same photo/IBE process to produce a well aligned back edge for SH and the WRLG.

The WRLG is based on Ohm's law, R=rho*t*h/L, where rho is the resistivity of the film of material used to make the WRLG, t is the film thickness, L is the length and h is the height, which is reduced as one laps more from the ABS side.

A photo/IBE process is used to produce a well aligned back edge for WG SH and WRLG. During lapping, SH can be calibrated to WRLG sensor height, then the resistance we measure between MP 20 and WS 40 can be used to derive PWA for each device if the MP thickness is not too thin. If the MP thickness is thin, then the resistance will be affected by both PWA and pole thickness (PT) and the PT should be included in the formula.

With the knowledge of both SH (using WRLG height) and PWA (from the value of R) for each device, we can improve EWAC sigma by a more sophisticated bending algorithm. The prior method assumes the neighboring rows had the same EWAC vs. WRLGH relation. The new method will provide a value of an additional parameter, PWA, for better decision making than when only using the results from the WRLG height.

Figure 6:
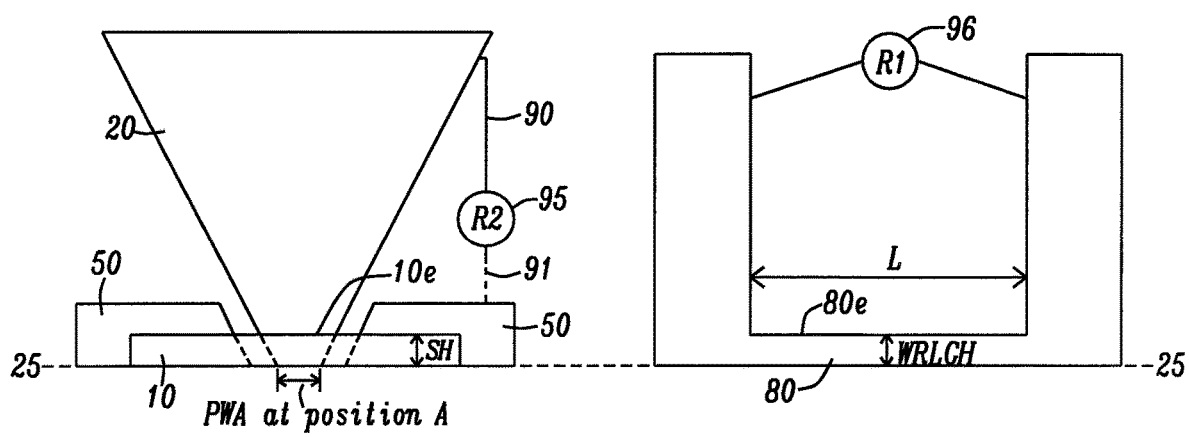
FIG. 6 is a top-down view showing the WG and SH in the PMR writer of FIG. 2, and the WRLG sensor having height WRLGH with respect to the ABS.

FIG. 6 shows a top-down view of the specially configured PMR writer with WG 10 in FIG. 2 where all layers above the WG have been removed. The overlap of a center portion of the WG on MP 20 is depicted as a trapezoidal shape between back edge 10e and the ABS 25-25. The WRGL sensor 80 has back edge 80e at height WRLGH from the ABS and a resistance measurement device 96 is used to determine resistance R1 of the WRGL sensor as mentioned previously. PWA at position A on the ABS is also shown.

Figure 3:
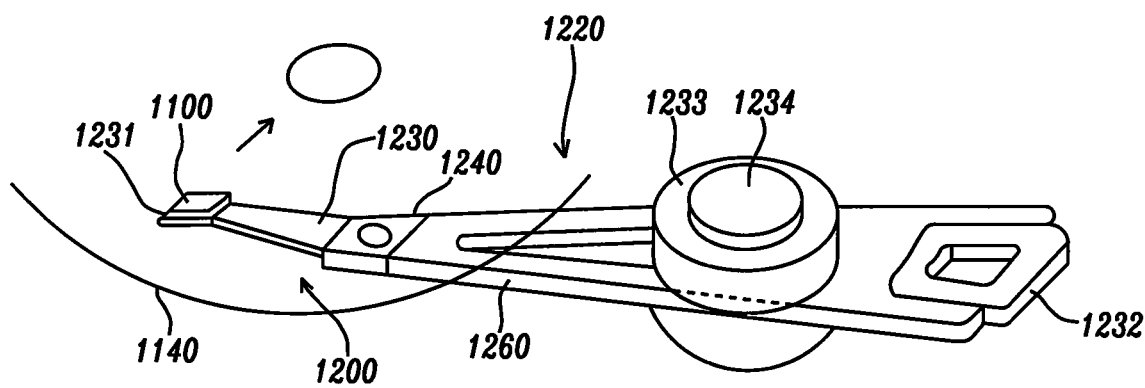
FIGS. 3, 4 and 5 schematically show the detailed structure of the present slider-mounted PMR incorporated into a HDD. The slider and PMR have been fabricated utilizing the improved methods of the present disclosure.

FIG. 3 shows a schematic drawing of a head gimbal assembly (HGA) 1200 that includes a slider-mounted PMR writer 1100, the slider now providing aerodynamic support to the writer when it moves above or below an operational disk recording medium 1140. There is also shown a suspension 1220 that elastically supports the slider-mounted writer 1100. The suspension 1220 has a spring-like load beam 1230 made with a thin, corrosion-free elastic material like stainless steel. A flexure 1230 is provided at a distal end of the load beam and a base-plate 1240 is provided at the proximal end. The slider mounted TAMR writer 1100 is attached to the load beam 1230 at the flexure 1231 which provides the TAMR with the proper amount of freedom of motion. A gimbal part for maintaining the PMR read/write head at a proper level is provided in a portion of the flexure 1231 to which the TAMR 1100 is mounted.

A member to which the HGA 1200 is mounted to arm 1260 is referred to as head arm assembly 1220. The arm 1260 moves the read/write head 1100 in the cross-track direction (arrow) across the medium 1140 (here, a hard disk). One end of the arm 1260 is mounted to the base plate 1240. A coil 1232 to be a part of a voice coil motor (not shown) is mounted to the other end of the arm 1260. A bearing part 1233 is provided to the intermediate portion of the arm 1260. The arm 1260 is rotatably supported by a shaft 1234 mounted to the bearing part 1233. The arm 1260 and the voice coil motor that drives the arm 1260 configure an actuator.

Figure 4:
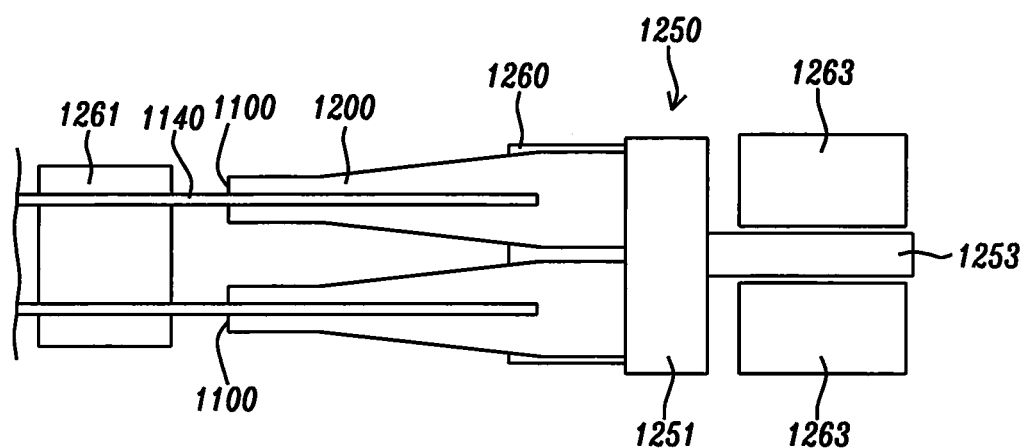
Figure 5:
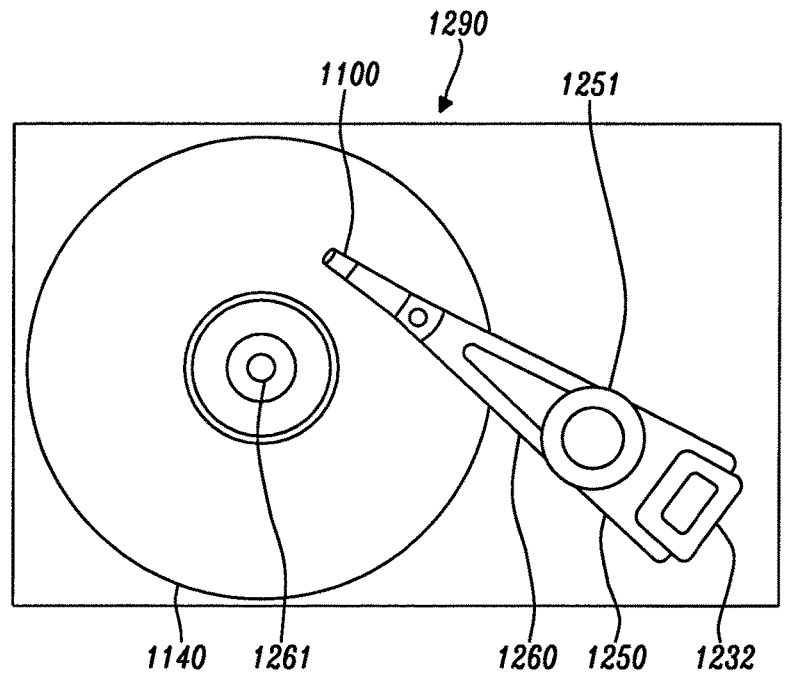

Referring next to FIG. 4 and FIG. 5, there is shown, schematically, a head stack assembly 1250 and a magnetic recording apparatus in which the slider-mounted TAMR writer 1100 is contained. The head stack assembly is an element to which the HGA 1200 is mounted to arms of a carriage having a plurality of arms for engaging with a plurality of disks 1140. The plurality of disks are mounted on a spindle 1261. FIG. 4 is a side view of this assembly and FIG. 5 is a plan view of the entire magnetic recording apparatus.

Finally, the head stack assembly 1250 is shown incorporated into a magnetic recording apparatus 1290. The magnetic recording apparatus 1290 has a plurality of magnetic recording media 1114 mounted on a spindle motor 1261. Each individual recording media 1114 has two TAMR elements 1100 arranged opposite to each other across the magnetic recording media 14 (shown clearly in FIG. 5). The head stack assembly 1250 and the actuator (except for the write head itself) act as a positioning device and support the PMR heads 1100. They also position the PMR heads correctly opposite the media surface in response to electronic signals. The read/write head records information onto the surface of the magnetic media by means of the magnetic pole contained therein.

A member to which the HGA 1200 is mounted to arm 1260 is referred to as head arm assembly 1220. The arm 1260 moves the read/write head 1100 in the cross-track direction (arrow) across the medium 1140 (here, a hard disk). One end of the arm 1260 is mounted to the base plate 1240. A coil 1231 to be a part of a voice coil motor (not shown) is mounted to the other end of the arm 1260. A bearing part 1233 is provided to the intermediate portion of the arm 1260. The arm 1260 is rotatably supported by a shaft 1234 mounted to the bearing part 1233. The arm 1260 and the voice coil motor that drives the arm 1260 configure an actuator.

As is finally understood by a person skilled in the art, the detailed description given above is illustrative of the present disclosure rather than limiting of the present disclosure. Revisions and modifications may be made to methods, materials, structures and dimensions employed in forming and providing a wafer-based process employing a built-in electric sensor for measuring the top pole width, PWA, of a PMR writer that may be configured for MAMR operation while still forming and providing such a structure and its method of formation in accord with the spirit and scope of the present invention as defined by the appended claims.

I claim:

1. A method of determining a trailing edge main pole (MP) width (PWA) at a position A of an air bearing surface (ABS) of either a specially configured, perpendicular magnetic recording (PMR) writer or microwave assisted (MAMR) writer having a built-in sensor, during a lapping process, and using said PWA as a measure of PWA's of a set of PMRs or MAMRs, not having the built-in sensor, but being simultaneously subjected to said same lapping process, wherein said MP has a trapezoidal cross-section at the ABS with two sides and a trailing edge that is wider than a leading edge, and wherein a write gap (WG) that is filled with a conductive material or a microwave generating stack is formed between said trailing edge and a write shield (WS), and wherein side gaps filled with insulating material separate the MP sides from leading shields that are laterally disposed from the MP, said method comprising:

providing an adjacent writer resistive lapping guide (WRLG) sensor having a back edge that is a WRLG height (WRLGH) from the ABS and a first resistance measurement device to measure a resistance of the WRLG sensor that is calibrated to WRLGH and an effective throat height (eTHd) that is the same as a write gap step height (WG SH) at a back edge of the WG forming the built-in sensor; that comprises the WG, WS, MP, and a resistance measuring circuit having a lead to the MP and a lead to the WS, and a second resistance measurement device that measures a resistance R between said MP and said WS at selected stages of said lapping process, and then using both a value of R and a value of eTHd (WG SH) from the WRLG sensor measurement to obtain a desired value of PWA using a formula expressing PWA in terms of said measured values.

2. The method of claim 1 wherein said measured value of R is related to said desired value of PWA by the following formula: R=1/(A+B*PWA*SH+C*SH)+R_L, wherein R_L is the resistance of the leads used in making said measurement of R and wherein SH is the WG SH that is calibrated to said resistance of the WRLG sensor, and A, B and C are constants that have already been evaluated by successive measurements at selected preliminary steps in said lapping process.

3. The method of claim 1 wherein said conducting material in the WG is Ru/NiCrx/Ru in said PMR case or the microwave generator stack in said MAMR case.

4. The method of claim 1 wherein a back edge of the WG is aligned with a back edge of the WRLG sensor.

5. A specially configured non-functional PMR (perpendicular magnetic recording) or MAMR (microwave assisted magnetic recording) writer for measuring main pole (MP) widths during a lapping process, comprising:

a MP having a trapezoidal cross-section in an air-bearing surface (ABS) plane, a write-gap (WG) formed on a trailing edge surface of said MP and extending laterally and symmetrically beyond said trailing edge surface, a write shield (WS) above said (WG), side gaps (SG) filled with an insulating material and disposed against and contacting both lateral sides of said MP, and leading shields (LS) disposed on either side of said SG, wherein said special configuration comprises:

a (built-in sensor) comprising the MP, WS, the WG that is filled with a conductive material or a microwave generator stack, and a resistance measuring circuit to measure a resistance, R, between said MP and said WS that is comprised of a resistance measurement device connected with a lead to the MP and with a lead to the WS; whereby a measurement of said resistance, R, during a lapping process on said PMR or MAMR writer, and SH (a step height of the WG) that is measured using an adjacent Writer Resistive Lapping Guide (WRLG) sensor are used to determine a width of a trailing edge, PWA, of said MP in said ABS.

6. The specially configured non-functional PMR or MAMR writer of claim 5 wherein said conducting material in said WG is Ru/NiCrx/Ru or other conducting metals, alloys and multilayers.

7. The specially configured non-functional PMR or MAMR writer of claim 5 wherein said WRLG sensor is a variable resistance sensor, comprising a resistive WRLG layer with a film thickness, t, that determines its resistance according to Ohm's law as expressed by the formula $R_{WLG}$=rho*t*h/L, where rho is the resistivity of said WRLG layer, t is said film thickness, h is a height (WRLGH) of the WRLG layer measured from its distal ABS edge to a back edge thereof, and L is a length of the WRLG layer and wherein, said WRLG sensor is configured so that WRLGH is reduced as the ABS side of a wafer is lapped away and wherein the amount of reduction is established by a measurement of its resistance.

8. The specially configured non-functional PMR or MAMR writer of claim 5 wherein a back edge of the WG is aligned with a back edge of the WRLG sensor.

9. A perpendicular magnetic recording (PMR) writer or microwave assisted magnetic recording (MAMR) writer, comprising:

a magnetic main pole (MP) emerging at an air-bearing surface (ABS), said MP having a trapezoidal ABS face that is wider at a cross-track trailing edge surface, denoted "A", said width at "A" being denoted PWA, than at a parallel leading edge surface and wherein said trailing and leading edge surfaces are connected by symmetrically formed side edge surfaces;

a write gap layer (WG) formed over said "A" surface and extending symmetrically beyond lateral edges of said "A" surface and having a back edge at a SH from the ABS; wherein said WG is a conductive material in the PMR writer or a microwave generating stack in said MAMR writer;

side gap layers formed against side edge surfaces, said side gap layers abutting undersides of said write gap layer;

and a write shield (WS) on the WG;

wherein the value of PWA has been accurately estimated with a built-in electrical resistive sensor measurement using a first resistance measurement device connected with a lead to the MP and a lead to the WS to determine a resistance R in the built-in sensor comprised of the WG, WS and MP; and with an adjacent writer resistance lapping guide (WRLG) sensor configured to produce a second resistance measurement that is calibrated to the WG SH.

10. A head gimbal assembly, comprising:
said PMR or MAMR writer of claim 9;
a suspension that elastically supports said PMR writer or said MAMR writer, wherein
said suspension further comprises a flexure to which said PMR writer or said MAMR writer is joined, a load beam with one end connected to said flexure and a base plate connected to the other end of said load beam.

11. A HDD (Hard Disk Drive), comprising:
said head gimbal assembly of claim 10;
a magnetic recording medium positioned opposite to said PMR writer or said MAMR writer;
a spindle motor that rotates and drives said magnetic recording medium; and a device that supports the slider and positions said slider relative to said magnetic recording medium.

* * * * *